United States Patent
Finley et al.

(10) Patent No.: US 9,111,273 B2
(45) Date of Patent: Aug. 18, 2015

(54) TECHNIQUES FOR CHECKING INTO A RETAIL ESTABLISHMENT

(71) Applicant: NCR Corporation, Duluth, GA (US)

(72) Inventors: Michael Cain Finley, Roswell, GA (US); Bisser Paskalev, Alpharetta, GA (US)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 13/663,763

(22) Filed: Oct. 30, 2012

(65) Prior Publication Data
US 2014/0117086 A1    May 1, 2014

(51) Int. Cl.
*G06K 15/00* (2006.01)
*G06Q 20/32* (2012.01)
*G06K 19/06* (2006.01)

(52) U.S. Cl.
CPC ...... *G06Q 20/3224* (2013.01); *G06K 19/06206* (2013.01); *G06Q 20/327* (2013.01); *G06Q 20/3278* (2013.01)

(58) Field of Classification Search
CPC ..... G06Q 20/20; G06Q 20/32; G06Q 20/322; G06Q 20/325; G06Q 20/327; G06Q 30/0259; G06Q 30/0261; G07G 1/00; G07G 1/0009; G07G 1/0036; G08B 13/246; H04W 4/008
USPC .......................... 235/375, 380, 383, 451, 492; 705/14.37, 14.38
See application file for complete search history.

(56) References Cited

U.S. PATENT DOCUMENTS

| 7,740,171 | B2 * | 6/2010 | Kingsborough et al. | 235/383 |
| 7,857,212 | B1 * | 12/2010 | Matthews | 235/380 |
| 2006/0079180 | A1 * | 4/2006 | Sinivaara | 455/41.2 |
| 2007/0248180 | A1 | 10/2007 | Bowman et al. | |
| 2009/0174527 | A1 * | 7/2009 | Stewart | 340/10.1 |
| 2010/0320266 | A1 * | 12/2010 | White | 235/375 |
| 2011/0215138 | A1 | 9/2011 | Crum | |
| 2011/0236260 | A1 * | 9/2011 | Kim et al. | 422/68.1 |
| 2012/0226568 | A1 * | 9/2012 | Hargraves et al. | 705/26.1 |
| 2012/0232917 | A1 * | 9/2012 | Al-Khudairy et al. | 705/2 |
| 2013/0103486 | A1 * | 4/2013 | Hess et al. | 705/14.38 |
| 2013/0218721 | A1 * | 8/2013 | Borhan et al. | 705/26.41 |

FOREIGN PATENT DOCUMENTS

GB    2 488 897    9/2012

OTHER PUBLICATIONS 12-1834 Application No. 13180930.3-1955 Form 1507 EP Extended search report—Feb. 14, 2014.
12-1834 form 1507N extended European search report GB2488897A 1 of 2.
12-1834 form 1507N extended European search report GB2488897A 2 of 2.

* cited by examiner

*Primary Examiner* — Tuyen K Vo
(74) *Attorney, Agent, or Firm* — Joseph P. Mehrle; Andrew J. Thomson

(57) ABSTRACT

Techniques for checking into a retail establishment are provided. A retailer provides a substrate having a magnetic-field encoded tag. A consumer waves the consumer's device over the tag to electronically capture the magnetic-field encoded tag. The consumer's device is used to communicate the tag to a retailer to validate that the consumer is physically present and now checked into the retail establishment of the retailer.

20 Claims, 3 Drawing Sheets

TECHNIQUES FOR CHECKING INTO A RETAIL ESTABLISHMENT

BACKGROUND

Automation for goods and services has reached record levels in society. Examples are everywhere from online banking and purchasing to a wide-range of devices and physical appliances that include computing and networking capabilities, which were just wishful dreams only a decade ago. For the most part, these advances have occurred because of breakthroughs in electronics and wireless communications, which have allowed complex processing and network connectivity to be achieved in the smallest of physical devices, such as a smart phone or other handheld computing devices, for relatively small cost and effort.

In addition, many retailers now gear services and promotions toward these devices for purposes of interacting with, attracting, and keeping customers at the retailer.

Many programs such as: promotions, specials, and loyalty servers at retailers (restaurants, etc.) rely on a means of knowing with certainty that a given consumer is at a given location. Consumers can "check-in" with merchants via smart phones but this often requires validation by a human waiter or long delays while Global Positioning Satellite (GPS_ solutions narrow in on a reading of sufficient accuracy to determine that the consumer is in fact in the correct location.

Furthermore, additional interaction of the future is going to be driven between the merchant and the consumer in situations where the consumer's mobile device is allowed to perform commercial activities related to the merchant's premises where they are physically located. In such situations, it is necessary for the consumer's mobile device to provide specific location information related to the merchant check-in so that he/she can be uniquely identified within the merchant's system. For example, a diner at a restaurant needs to have his/her phone linked with a specific table where he/she is eating if he/she is going to have information that is specific to his/her own transaction on his/her phone.

In fact, many techniques allow the consumer to check-in to a retailer's place of business. One example is a simple free (honor) check-in where the consumer says he/she is present, but this is not secure or reliable and is prone to fraud. Another means is for the consumer to "bump" his/her mobile device against another mobile device so that accelerometers in both devices can synchronize and establish co-location at a given time. But this approach involves physically assaulting your device, which is an expensive add-on to a typical smart phone and which could cause damage to the smart phone.

Another possibility is scanning of a Quick Response (QR) tag or barcode using the mobile phone's camera but this can be slow and frustrating to consumers. Moreover, pictures of barcodes or QR codes can be captured as electronic images and used for fraudulent check-in when a consumer is not actually present at a retailer's location.

As mentioned above, GPS is another means for self-check-in, but it suffers from local black-spots, slow settling times, and incorrect readings.

Third parties like ShopKick™ provide audio solutions for self-check-in but this solution requires expensive hardware installations to source the background sounds and has limited accuracy (spatial resolution).

Still another self-check-in mechanism uses Near Field Communication (NFC) tags, but this requires specialized NFC hardware in the consumer's smartphone.

One can see that as retailers desire more and more interaction with their consumers, the need for validating a real consumer is present on their premises is of paramount concern. Furthermore, the existing approaches in the industry are: prone to fraud, too expensive, and/or too inaccurate at present for any widespread adoption to take place in the industry.

SUMMARY

In various embodiments, techniques for checking into a retail establishment are presented. According to an embodiment, a method for consumer retail check-in is provided.

Specifically, a code is received from a mobile device of a consumer; the code is acquired at a retail location of a retailer as a magnetic-field encoded tag that the mobile device is waved over to acquire. Next, a consumer identifier for the consumer is identified and the code is associated with the retail location of the retailer. Finally, the retailer is notified that the consumer is checked-in to the retail location of the retailer.

DETAILED DESCRIPTION

Figure 1:
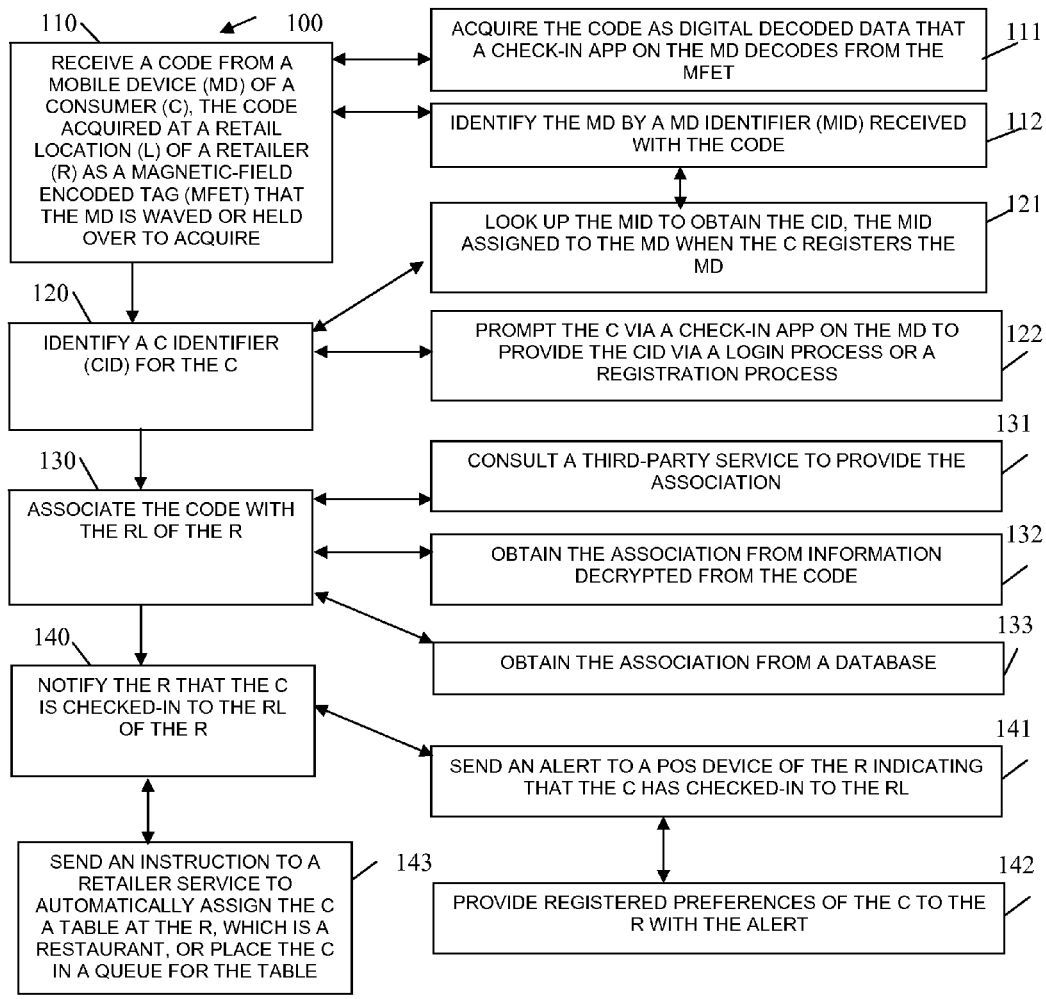
FIG. 1 is a diagram of a method for consumer retail check-in, according to an example embodiment.

FIG. 1 is a diagram of a method 100 for consumer retail check-in, according to an example embodiment. The method 100 (hereinafter "check-in manager") is implemented as instructions programmed and residing on a non-transitory computer-readable (processor-readable) storage medium and executed by one or more processors. The processors are specifically configured and programmed to process the check-in manager. The check-in manager operates over a network. The network is wired, wireless, or a combination of wired and wireless.

In an embodiment, the check-in manager processes on processors of a server of cloud processing environment. In some instances, the check-in manager processes on a Point-Of-Sale (POS) terminal of a retailer (such as a restaurant). The POS terminal can be, in some embodiments, a thin client that interacts with a remote server having the check-in manager. Moreover, the check-in manager can process on a Virtual Machine (VM) where the underlying physical processing environment and physical processors can vary depending upon the installation of the VM.

As used herein a "magnetic tag" refers to a series of alternating magnetic orientations and/or strengths that, in one embodiment, are arranged in strips of material (such as tape, etc.) in a unique pattern for a specific location of a specific retailer. Each magnetic tag's unique pattern of orientations and strengths is assigned via a mapping (maintained by one or more electronic services/databases) to the specific location of the specific retailer. In some instances, the magnetic tag can be assembled from separate strips of tape arranged in a particular sequence and/or series.

In some embodiments, the magnetic tag or magnetic-field tag can be generated via an electromagnet within a processor, which is then programmed to emulate and produce the series of aligned North/South magnetic orientations and/or strengths. Here, a mobile device of a consumer can be held over such process device (can be a Universal Serial Bus (USB) electromagnet) to capture the magnetic tag (magnetic-field tag). The emulated magnetic tag can be transmitted wirelessly via a broadcast and picked up by consumer mobile devices. In another case, a vibrator feature of a mobile device (can be a phone) is used to generate the magnetic tag that another consumer's mobile device picks up via its compass or processor-embedded magnetometer.

Moreover, as used herein the phrases "handheld device," "portable device," and/or "mobile device" may be used interchangeably and synonymously. These devices refer to a processing device having network capabilities and have a magnetometer or compass integrated therein. In an embodiment, these devices refer to a consumer's smart phone or a tablet device.

Most consumers have the capability on existing smart phones and tablets to use a compass in the device. These consumer devices have a magnetometer embedded within them that measure the earth's magnetic field and are very inexpensive. Magnetometers are widely used as metal detectors as well.

The techniques herein provide a user friendly mechanism for consumers to "check-in" to a location, such as a physical location of a retailer. As stated above, most smart phones include compass or magnetometer hardware capabilities. This capability is used to automate the entry of information into the phone for use in situations like a location "check-in." To do this, a series of magnetic strips with alternating orientations and/or strengths are placed in a row and the phone (type of consumer mobile device) is moved in a swiping gesture over them. Alternatively, a retail device emulates the magnetic tag, via broadcast or via vibration as discussed above. Each unique pattern of magnetic strips encodes a different location (or a different reference to a location which is mapped via a database). These magnetic strip combinations can be provided as a pre-packaged adhesive identifier, which is simply placed anywhere that a check-in point is needed by a retailer (when the embodiment for the tag is a strip and not emulated from an electromagnet as discussed above).

As used herein "retailer" can refer to anyone that is conducting business in some manner. So, in this sense it can be two friends conducting a transaction, such as to determine who at a party is checked in to the party. Furthermore, the "retailer" can be any organization conducting a transaction, such as universities, government, and the like.

So, a unique magnetic-field Identifier (ID) is established for a given retail location that needs to be identified in an automated check-in process. This ID is translated into a coding scheme like a barcode 3-of-9 or simple binary code with check sums. This coding is then used to fabricate an adhesive sticker (or other substrates) using magnetic materials, such as are commonly used in marketing/promotional magnets. The coding takes place by alternating orientations of the North/South magnets and/or by having alternating magnetic strengths. The adhesive sticker is then provided to the retail location, which needs to accept check-ins. In other cases, the coding is emulated from devices at the retailer's location using vibration or programmed electromagnets as discussed above.

Consumers entering the location view the sticker and identify that it is a check-in point. They start the check-in app (described below with reference to the FIG. 2) and waive their phone along the check-in sticker. In some cases, the consumers receive a broadcast of the tag via a programmed electromagnet as discussed above. The smartphone detects the variable magnetic field and decodes the stored unique ID. The smartphone then cross-references the ID (against a local and/or remote database (using a network connection)) to determine a physical location for a particular retailer. This may also provide a specific website back to the check-in app for the consumer to send the ID to confirm with that retailer that the consumer is physically present at the retail location and checked-in.

Again it is noted that the techniques provided herein, do not require new hardware features in consumer mobile devices as smartphones already include a required magnetic field reader; thus, an inexpensive automated check-in process that is user-friendly, inexpensive, fast, and that utilizes a flexible encoding scheme are achieved with the teachings herein and below.

At 110, the check-in manager receives a code from a mobile device of a consumer. The code is acquired at a retail location of a retailer as a magnetic-field encoded tag that the mobile device is waved or held over to acquire. The magnetic readings based on the North and South orientations or strength of the magnetic-field encoded tag is captured on the mobile device as the code when the mobile device is waved or held over the tag. In some cases, the magnetic-field encoded tag is embedded in a tape or other substrate affixed to an object at the retail location. In other cases, the magnetic-field encoded tag is broadcast from a device at the retail location that uses a programmed electromagnet to produce the magnetic-filed encoded tag.

According to an embodiment, at 111, the check-in manager acquires the code as digital data that a check-in app (described below with reference to the FIG. 2) on the mobile device decodes from the magnetic-field encoded tag. The magnetic readings are converted or translated to digital data or information.

In an embodiment, at 112, the check-in manager identifies the mobile device by a mobile device identifier received with the code. That is, the mobile device is identified by its mobile device identifier when the mobile device sends to the check-in manager the code.

At 120, the check-in manager identifies a consumer identifier for a consumer. This can be achieved in a variety of manners.

For example, at 121, the check-in manager looks up the mobile device identifier to obtain the consumer identifier. The mobile device identifier is assigned to the mobile device when the consumer registers the mobile device or downloads the check-in app to the mobile device for installation.

In another case, at 122, the check-in manager prompts the consumer via a check-in app on the mobile device to provide the consumer identifier via a login process or a registration process.

At 130, the check-in manager associates the code with the retail location of the retailer. Again, this can occur in a variety of ways.

For example, at 131, the check-in manager consults a third-party service to provide the association based on the code.

In another case, at 132, the check-in manager obtains the association from information decrypted in the code. That is, the magnetized tag can be an encryption for actual information that the check-in manager decodes via a known decryption key.

In an embodiment, at 133, the check-in manager obtaining the association from a database. The database may be local to the processing environment of the check-in manager or remove form the processing environment of the check-in manager.

At 140, the check-in manager notifies the retailer that the consumer is checked-in to the retail location of the retailer.

According to an embodiment, at 141, the check-in manager sends an alert to a POS device of the retailer indicating that the consumer has checked-in to the retail location. The POS device can be a terminal or server or even a portable handheld device of the retailer. Moreover, the alert can be sent to multiple POS devices within the retail location simultaneously. In fact, the retailer may even have a display monitor indicating who has checked in and in such a case the notification can be used to update the display that is in view for all to see including the consumer that is checked-in.

Continuing with the embodiment of 141 and at 142, the check-in manager provides registered preferences of the consumer to the retailer with the alert. Here, it may be that the check-in manager is a third-party service to the retailer and not part of the retailer's in-house systems and in such a situation, the consumer may have preferences for products or services of the retailer that the check-in manager communicates with the alert to the retailer.

In an embodiment, at 142, the check-in manager sends an instruction to a retailer service to automatically assign the consumer a table at the retailer, which is a restaurant, or place the consumer in a queue for the table. In this embodiment as well, the retailer may display this information and the queue on a common display that the consumer can see.

Figure 2:
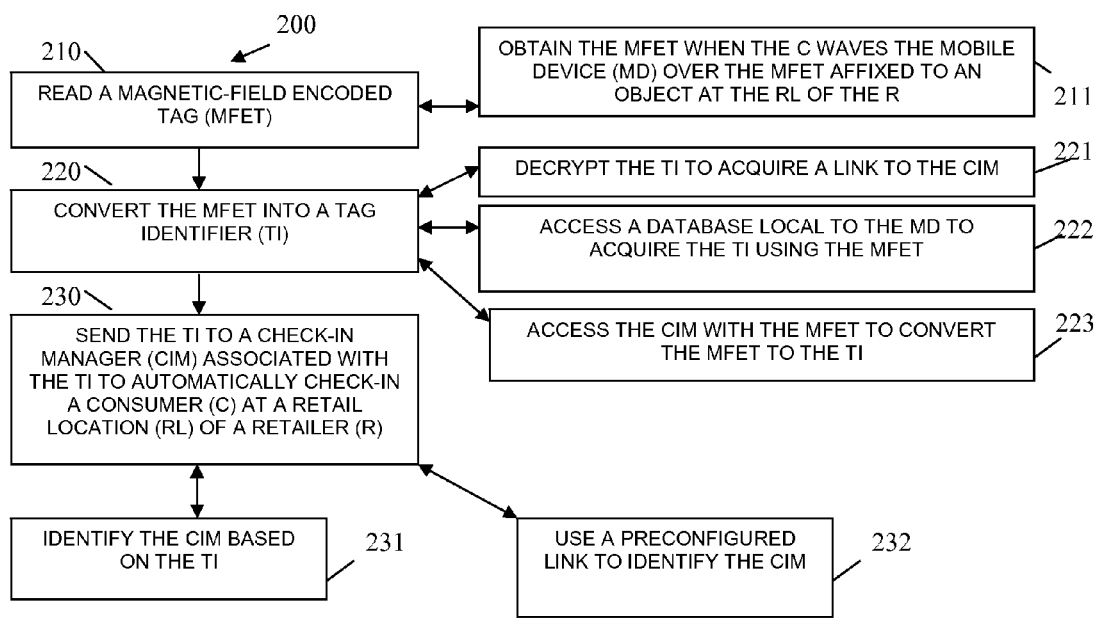
FIG. 2 is a diagram of another method for consumer retail check-in, according to an example embodiment.

FIG. 2 is a diagram of another method 200 for consumer retail check-in, according to an example embodiment. The method 200 (hereinafter "check-in app") is implemented as instruction and programmed within a non-transitory computer-readable (processor-readable) storage medium that executes on one or more processors of a handheld device; the processors of the handheld device are specifically configured to execute the check-in app. The check-in app is operational over a network; the network is wired, wireless, or a combination of wired and wireless.

Whereas the check-in manager (the FIG. 1 above) describes processing associated with check-in processing from one or more devices controlled by or accessible to a retailer, the check-in app describes processing associated with retail check-in from the perspective of a consumer's device for a consumer checking into the retailer.

At 210, the check-in app reads a magnetic-field encoded tag.

According to an embodiment, at 211, the check-in app obtains the magnetic-field encoded tag when the consumer waves the mobile device over the magnetic-field encoded tag affixed to an object at the retail location of the retailer. In another case, the check-in app obtains the magnetic-field encoded tag as a broadcast from a device of the retailer that produces the tag via a programmed electromagnet.

At 220, the check-in app converts the magnetic-field encoded tag into a tag identifier.

In an embodiment, at 221, the check-in app decrypts the tag identifier to acquire a link to the check-in manager (such as the check-in manager discussed above with reference to the FIG. 1).

In still another case, at 222, the check-in app accesses a database that is local to the mobile device (that processes the check-in app) to acquire the tag identifier using the magnetic-field encoded tag. The tag identifier associated with the retailer or a specific location of the retailer.

In yet another situation, at 223, the check-in app accesses the check-in manager with the magnetic-field encoded tag to convert the magnetic-field encoded tag to the tag identifier.

At 230, the check-in app sends the tag identifier to the check-in manager (FIG. 1) that is associated with the tag identifier. This is done to automatically check-in a consumer at a retail location of a retailer. The consumer identified by the mobile device that processes the check-in app and that sends the tag identifier.

According to an embodiment, at 231, the check-in app identifies the check-in manager based on the tag identifier.

In another case, at 232, the check-in app uses a preconfigured link to identify the check-in manager.

Figure 3:
FIG. 3 is a diagram of a retail check-in apparatus, according to an example embodiment.

FIG. 3 is a diagram of a retail check-in apparatus 300, according to an example embodiment.

The retail check-in apparatus 300 includes a magnetic-field encoded tag 301. The magnetic-field encoded tag 301 comprises a predefined sequence or series of North and South magnets having varying degrees of orientation and/or strengths, the magnetic-field encoded tag 301 providing a unique identifier that is associated with a physical location of a particular retailer.

In another case, the retail check-in apparatus 300 includes a processor having memory that is programmed with the magnetic-filed encoded tag and that transmits the predefined sequence or series of North and South magnetic information having varying degrees of orientation and/or strengths, the magnetic-field encoded tag 301 providing the unique identifier that is associated with a physical location of a particular retailer. In one case of this embodiment, the processor is embedded in a USB device. In another case, the processor is embedded in a mobile device, such as a phone or a tablet.

According to an embodiment, the magnetic-field encoded tag 301 is embedded in a substrate that is affixed to an object located at the physical location of the particular retailer. In one case, the substrate is magnetic tape.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A processor-implemented method programmed in memory or a non-transitory processor-readable medium and to execute on one or more processors of a device configured to execute the method, comprising:
   receiving, by the device, a code from a mobile device of a consumer during a check-in procedure, the code acquired at a retail location of a retailer as a magnetic-field encoded tag that the mobile device is waved or held over to acquire and the magnetic-field encoded tag generated by a retailer device of the retailer through vibrations detected by the mobile device;
   identifying, by the device, a consumer identifier for the consumer;
   identifying, by the device, the retail location of the retailer based at least in part on the code; and
   notifying, from the device, the retailer that the consumer is checked-in to the retail location of the retailer.

2. The method of claim 1, wherein receiving further includes acquiring the code as digital decoded data that a check-in app on the mobile device decodes from the magnetic-field encoded tag.

3. The method of claim 1, wherein receiving further includes identifying the mobile device by a mobile device identifier received with the code.

4. The method of claim 3, wherein identifying further includes looking up the mobile device identifier to obtain the consumer identifier, the mobile device identifier assigned to the mobile device when the consumer registers the mobile device.

5. The method of claim 1, wherein identifying further includes prompting the consumer via a check-in app on the mobile device to provide the consumer identifier via a login process or a registration process.

6. The method of claim 1, wherein identifying the retail location further includes consulting a third-party service with the code to identify the retail location.

7. The method of claim 1, wherein identifying the retail location further includes obtaining the retail location from information decrypted from the code.

8. The method of claim 1, wherein identifying the retail location further includes obtaining the retail location from a database using the code.

9. The method of claim 1, wherein notifying further includes sending an alert to a Point-Of-Sale (POS) device of the retailer indicating that the consumer has checked-in to the retail location.

10. The method of claim 9, wherein sending further includes providing registered preferences of the consumer to the retailer with the alert.

11. The method of claim 1, wherein notifying further includes sending an instruction to a retailer service to automatically assign the consumer a table at the retailer, which is a restaurant, or place the consumer in a queue for the table.

12. The method of claim 1, wherein the magnetic-field encoded tag comprises a series of at least one of alternating magnetic orientations and alternating magnetic strengths.

13. The method of claim 1, wherein the device is located remotely from the retail location.

14. A processor-implemented method programmed in a non-transitory processor-readable medium and to execute on one or more processors of a device configured to execute the method, comprising:

receiving, by the device, check-in information from a mobile device, the check-in information comprising a code acquired at a retail location of a retailer from a magnetic tag that the mobile device is waved over to acquire and an identifier identifying the mobile device and the magnetic tag generated by a retailer device of the retailer through vibrations detected by the mobile device;

determining, by the device, the retail location of the retailer based at least in part on the code; and checking in, by the device, the consumer at the retail location.

15. The method of claim 14, wherein the device is located remotely from the retail location.

16. The method of claim 14, wherein the retail location is a restaurant and wherein the method further comprises:

assigning the consumer, by the device, to a table at the restaurant after checking in the consumer.

17. The method of claim 14, wherein the identifier is received with the code by the device.

18. The method of claim 17, further comprising:

identifying the consumer based at least in part on the mobile device identifier.

19. The method of claim 14, further comprising:

notifying, by the device, an entity at the retailer location that the consumer has checked in to the retailer location.

20. The method of claim 14, wherein the magnetic tag comprises a sequence of magnets varying by at least one of orientation and strength.

* * * * *